United States Patent [19]

Richcreek

[11] 4,070,788
[45] Jan. 31, 1978

[54] PRAWN TRAP

[76] Inventor: Harry G. Richcreek, 1098 H St., Crescent City, Calif. 95531

[21] Appl. No.: 722,892

[22] Filed: Sept. 13, 1976

[51] Int. Cl.² .............................................. A01K 69/00
[52] U.S. Cl. ................................................... 43/100
[58] Field of Search ........................... 43/100, 102, 65

[56] References Cited

U.S. PATENT DOCUMENTS

| 185,110 | 12/1876 | Koons | 43/65 |
|---|---|---|---|
| 1,329,128 | 1/1920 | McCaughan | 43/100 |
| 2,196,928 | 4/1940 | Lile | 43/100 |
| 3,045,386 | 7/1962 | Coyne | 43/100 |
| 3,232,000 | 2/1966 | Gale et al. | 43/100 |

Primary Examiner—Jay N. Eskovitz
Assistant Examiner—Daniel J. Leach
Attorney, Agent, or Firm—Townsend and Townsend

[57] ABSTRACT

A prawn trap including a floor member and pairs of side and end walls connected to the floor member to define an enclosure having an upper opening. An entrance structure, coupled across the opening, includes a plurality of first and second spaced, elongate elements arranged to incline downwardly into the enclosure in converging relation to one another. All but a selected few of the first elements are of sufficient length to allow the first elements to be positioned in interlaced relation with the second elements. The selected few of the first elements are shorter than the rest to define a limited number of prawn-receiving openings into the trap. The side and end walls are provided covering to darken the interior of the enclosure. The interior of the enclosure is made accessible by hingedly attaching one side wall.

10 Claims, 3 Drawing Figures

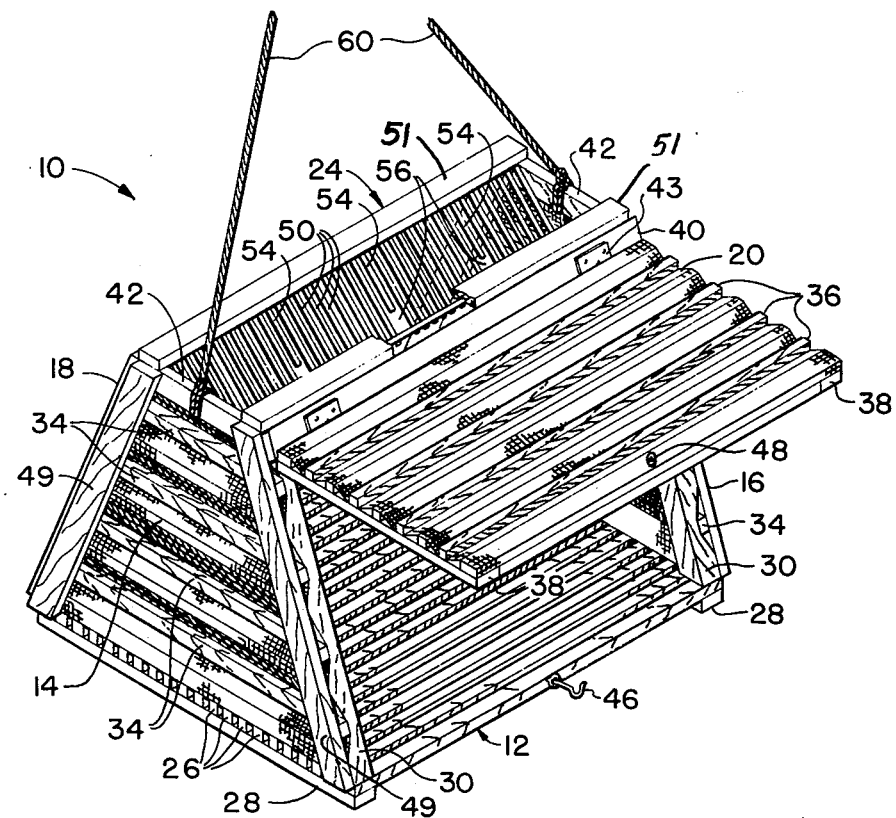
FIG._1.
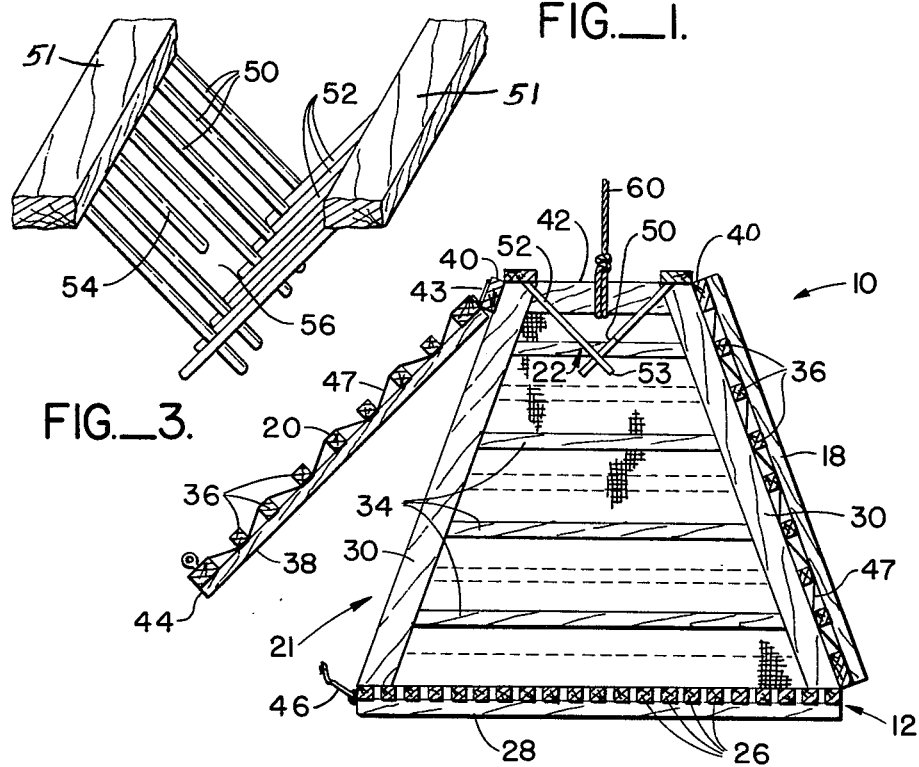
FIG._3.
FIG._2.

PRAWN TRAP

The present invention relates generally to traps for use in fishing, and more particularly to an improved trap for catching prawns.

DESCRIPTION OF THE PRIOR ART

The use of traps for catching fish, crustacean, and other sea life has long been known, and many different traps have been constructed. However, the traps presently being used possess problems which make their use for entrapping prawns inefficient. Many such traps are foraminous enclosures which provide an entry passage leading into the enclosure. Fish and certain crustacean, entering the passageways, which are constructed to make exit therefrom difficult, become entrapped in the enclosure. Unfortunately, the passageways are of such dimensions and construction that prawns are easily able to find and exit through these passageways. The foraminous enclosure provides sufficient light for the interior of the trap to allow the prawn to find an entrance passage for escaping therefrom. Additionally, foraminous enclosures allow the enticement feature (e.g., scent, for example) of the bait to radiate in all directions. The prawn is not necessarily led to the trap entrance by the bait.

Therefore, a major object of the present invention is to provide apparatus for the entrapment of prawns, lured into the interior thereof by bait or the like, by providing an enclosure that has a darkened interior and a limited number of prawn-receiving openings so that when the prawn enters the enclosure, it is unable to find its way out.

An additional object of the present invention is to provide a prawn trap which causes the bait attraction element to emanate proximate, and therefore draw the prawns towards, the entrance of the trap.

Another object of the present invention is to provide a prawn trap which can be readily emptied of its contents when raised to the surface of the water.

A further object of the invention is to provide a prawn trap which, although of relatively light weight so that it may be easily raised and lowered in the water, is quite rigid, holds its shape, and will remain stable at the underwater level to which it is lowered.

A further object of the invention is to provide a practical, reliable, and durable prawn trap which is exceedingly effective for the purpose for which it is designed, and which can be used at varying depths of water.

These objects are accomplished by the structure and relative arrangement of parts of the present invention as will fully appear by a review of the following description of the preferred embodiment and claims.

BRIEF DESCRIPTION OF THE DRAWINGS

FIG. 1 is a perspective view of a prawn trap constructed in accordance with the present invention;

FIG. 2 is a cross-sectional end view of the prawn trap of FIG. 1; and

FIG. 3 is a partial perspective view of the entrance structure of the prawn trap of FIG. 1.

DETAILED DESCRIPTION OF THE PREFERRED EMBODIMENT

Turning now to the drawings, in which the same reference numerals refer to corresponding parts in each of the several views, there is shown a prawn trap generally designated by the reference numeral 10. The prawn trap 10 is generally an enclosurelike structure defined by a generally planar floor member 12, end walls 14 and 16 extending upward from the floor, side walls 18 and 20 extending between the two end walls. The side walls extend upward from the floor member in a generally converging relation to one another. An enclosure opening 22 is defined by the upper extremities of the side and end walls across which is coupled entrance structure 24.

The floor member 12 includes a number of spaced, parallel laths 26 which extend the longitudinal length of the floor between end members 28 to which they are attached. End walls 14 and 16, as are the side walls 18 and 20, are similar in construction. The end walls each include a pair of inclined frame members 30, which form an acute angle with end member 28, and a number of spaced, parallel laths 34 extending between end frame members. Similarly, side walls 18 and 20 can be seen to include a number of parallel, spaced laths 36 supported by and extending between a pair of spaced-apart, parallel frame members 38.

Side wall 20 is hingedly connected to an hupper side-support member 40 by hinges 43 to provide access to the interior of the trap. Additionally, the bottom portion 44 is provided a hook-type latch 46 which, in conjunction with the eye 48, of side wall 20, allows side wall 20 to be secured to the floor member.

The inclined end frames 30 are held in their spaced relation above floor member 12 by longitudinally extending upper side-support members 40 and end-support members 42 which define opening 22.

End walls 14 and 16 and side walls 18 and 20 also include a cover material 47 interwoven among alternating laths 30. The ends of the material are further secured to the side and end walls by battens 49. It should be noted that the floor member is not covered but is left uncovered so that the water may flow through the interstitial area between laths 26 to facilitate the descent of the trap 10 in the water.

Coupled across the enclosure opening 22 is entrance structure 24. Entrance structue 24 includes a plurality of first and second elongate rods or elements 50 and 52, respectively, which extend angularly from element supports 51 into the interior of the trap 10 in a converging relation to one another. A major portion of the first elements 50 and all of elements 52 are of sufficient length to position these elements in the converging interlaced arrangement shown in the Figures. A spaced, equidistant few elements 54 of elements 50 are cut shorter to thereby define a limited number of prawn-receiving openings 56 in the entrance structure.

First and second elements 50 and 52 are of sufficient length so that their respective distal ends extend somewhat beyond the oppositely converging elements. The reason for this feature will be explained below.

A sling 60 is attached to the upper end-support members 42 for raising and lowering the trap 10.

The trap 10 may be constructed primarily of wood to provide a lightweight, inexpensive prawn trap. The cover material 47, interwoven among the laths 30 of the end and side walls 14, 16 and 18, 20, respectively, is preferably burlap or other material that can prevent light from entering the interior of the trap. Sling 60 may be a nylon rope or the like.

Typical dimensions of the trap 10 are as follows: The floor member measures 26 inches by 36 inches. The laths 26 of the floor memrer are approximately three-fourth inches square and spaced about one-half inch apart. The walls 14 and 16 and end walls 18 and 20 are constructed so that entrance structure 24 will be situated about 20 inches above the floor member with opening 22 measuring approximately 10 inches by 36 inches. Laths 30 of the side and end walls may have the same cross-section as laths 26 and are spaced approximately 2⅜ inches apart. The first and second elements 50 and 52 may be cylindrical wooden dowels having ¼ inch diameters. The elements 50, as are elements 52, are spaced inches apart - measured center-to-center. Elements 50 are 6¼ inches long, and elements 52 are 7¼ inches long. The selected few elements 54 of elements 50 are 4½ inches long to define a prawn-receiving opening 56 being approximately 1½ inches square.

In use, bait or some other type lure, such as a flashing light or the like, would be placed in the interior of the trap 10 on the floor 12. The side wall or door 20 would then be closed and latched. The trap would then be lowered into the water via a nylon sling 60. It should be noted, as mentioned above, that as the trap is lowered in the water, the floor laths 26 allow the water to pass through them, into the interior of the trap and out the upper opening 22 through the entrance structure 24. In this way the spaced laths 26 facilitate lowering of the trap through the water.

The trap may be allowed to settle on the ocean floor or hang above the ocean floor from sling 60. Prawns are drawn to the trap by whatever bait or lure contained within. In this respect, it should be noted that the material 47 which covers the side and end walls of the enclosure will tend to concentrate the bait scent about the prawn entrances. Thus, while the prawns are attracted to the trap by the scent, they will be drawn to the portion of the trap having the prawn-receiving openings 56.

The prawns enter the trap 10 through the prawn-receiving openings 56 and, after entering the interior of the trap, tend to migrate towards the bail or lure situated on the floor 12 of the trap. Once inside the trap, the prawns experience great difficulty in escaping therefrom due to the absence of light and limited number of prawn openings. Additionally, the prawns are kept from finding the opening by the interleaved arrangement of the first and second elements together with the extension of the distal ends of one set of elements beyond the oppositely converging other set of elements. It has been found that prawns tend to avoid and back away from object pointed at them - particularly if the object has a relatively sharp portion. The prawns attempt to escape from the trap by migrating along the side and end walls, up from the bottom of the tap to the top. However, when they come into contact with the relatively sharp edges of the blunt distal ends of the dowels, they will retreat, become confused, and look elsewhere for escape.

Thus, the prawns are unable to leave because they cannot find their way to and through the limited number of openings available.

To unload the trap, it is merely raised to the surface by sling 60. The side wall 20 can then be opened over a box or other container, into which the entrapped prawn are discharged through opening 21.

From the foregoing description, it will readily be seen that there has been produced a prawn trap that substantially fulfills the objects of the invention, as set forth hereinabove.

While this specification sets forth in detail the present and preferred construction of the prawn trap, still in practice such deviations from such detail may be resorted to as to not form a departure from the spirit of the invention, as defined by the appended claims.

I claim:

1. Apparatus for entrapping prawns, comprising:
an enclosure having a bottom member, a pair of side walls and a pair of end walls, the end and side walls attached to and extending upward from the bottom member, said enclosure having an opening defined by the upper extremities of the side and end walls, the side and end walls having means for preventing light therethrough to keep the interior of the enclosure relatively dark;
an entrance structure coupled across the opening and having a plurality of first and second spaced downwardly inclined elements, the first and second elements having upper edges coupled to the upper extremities of the side wall to position the elements in converging relation to each other, a major portion of the first elements interlaced with the second elements at the lower ends thereof, certain of the first elements being shorter than adjacent first elements to define spaced, prawnreceiving openings in said entrance structure.

2. The apparatus of claim 1, wherein one of the side walls is shiftable to a location permitting access to the interior of the enclosure.

3. The apparatus of claim 2, wherein the enclosure opening is generally rectangular.

4. The apparatus of claim 1, wherein the light-preventing means includes a covering for the side and end walls of a woven material.

5. The apparatus of claim 4, wherein each side wall and each end wall includes a plurality of spaced, lath-like elements, the material being interwoven among alternate of the lath-like elements.

6. The apparatus of claim 5, wherein the material is burlap.

7. The apparatus of claim 3, wherein the side walls converge with one another as the upper extremities thereof are approached.

8. The apparatus of claim 5, wherein the bottom member includes a plurality of spaced lath-like elements.

9. A prawn trap, comprising:
a floor member including a plurality of longitudinally extending spaced elements;
a pair of end walls connected to the floor member and extending generally upward therefrom;
a pair of side walls connected to the floor members and extending between the end walls, the side walls extending upward from the floor member in converging relation to one another, one of the side walls being shiftable to a location permitting access of the trap, the side and end walls including a plurality of spaced lath-like elongate elements, the upper extremities of the side and end walls defining an opening;
means coupled to the side and end walls for preventing light therethrough to keep the interior of the trap relatively dark;
an entrance structure coupled across the opening and having a plurality of first and second spaced, downwardly inclined elongate elements, the first and second elements having upper ends coupled to the upper extremities of the side walls and arranged in converging relation to one another, a major portion of the first elements interlaced with the second elements at the lower ends thereof, certain of the first elements being shorter than adjacent first elements to define spaced, prawn-receiving openings in the entrance structure.

10. The prawn trap of claim 1, wherein the lightpreventing means includes a burlap material coupled in interwoven relation with the lath-like elements of the side and end walls.

* * * * *